United States Patent [19]

Fleischer

[11] Patent Number: 4,608,753

[45] Date of Patent: Sep. 2, 1986

[54] MINIMIZATION OF VOLTAGE DELAY IN LITHIUM OXYHALIDE CELLS

[75] Inventor: Niles A. Fleischer, Madison, Wis.

[73] Assignee: Rayovac Corporation, Madison, Wis.

[21] Appl. No.: 809,849

[22] Filed: Dec. 17, 1985

Related U.S. Application Data

[63] Continuation of Ser. No. 506,988, Jun. 23, 1983, abandoned.

[51] Int. Cl.$^4$ .................. H01M 6/00; H01M 6/14
[52] U.S. Cl. ..................... 29/623.1; 429/48; 429/101; 429/196; 29/623.5
[58] Field of Search .............. 429/48, 101, 196; 29/623.1, 623.5

[56] References Cited

U.S. PATENT DOCUMENTS

3,993,501 11/1976 Kalnoki-Kis .................. 429/101 X
4,170,693 10/1979 Catanzarite .................... 424/48
4,296,185 10/1981 Catanzarite .................. 429/101 X

FOREIGN PATENT DOCUMENTS

151624 10/1981 German Democratic Rep. .

Primary Examiner—Brian E. Hearn
Assistant Examiner—Stephen J. Kalafut
Attorney, Agent, or Firm—Kenyon & Kenyon

[57] ABSTRACT

Passivation of lithium anodes in contact with thionyl chloride cathode/electrolytes is reduced by adding to the electrolytes a substance from the group of alkyl 2 cyanoacrylates and acrylic and substituted acrylic ester polymers.

9 Claims, No Drawings

MINIMIZATION OF VOLTAGE DELAY IN LITHIUM OXYHALIDE CELLS

This is a continuation of co-pending application Ser. No. 506,988 filed on June 23, 1983, now abandoned.

TECHNICAL FIELD

The present invention is directed to a method for reducing voltage delay encountered in, for example, lithium-thionyl chloride cells.

BACKGROUND OF THE INVENTION AND THE PRIOR ART

It is known in the art that electrochemical cells having an anode of lithium or other Group I metal have high energy densities, high voltages, wide temperature operating ranges, long shelf-life and relatively low cost.

In such cells, the type now commonly referred to as the liquid oxyhalide cell are of particular interest. These cells are described, for example in U.S. Pat. No. 3,926,669 and in British Pat. No. 1,409,307. In accordance with the teachings of the aforementioned patents, the electrolyte, which, together with the current collector, functions as the cathode, comprises an oxyhalide, for example thionyl chloride.

One attractive system is provided through the use of thionyl chloride, a solute of lithium aluminum tetrachloride, a lithium anode and a cathode current collector, which may be for example compressed carbon black. Despite the numerous advantages envisioned for lithium liquid oxyhalide batteries, it has been found that problems occur with these cells. A particular problem has been identified as that of voltage delay particularly occurring when the batteries are stored at elevated temperatures. The voltage delay problem is characterized by two features; to wit, a dip in voltage below a defined cutoff voltage and the time required for the voltage to rise back to the cutoff voltage. The problem is believed to result from passivation of the lithium anode due apparently to reactions between the lithium anode and constituents of the electrolyte.

In accordance with U.S. Pat. No. 4,170,693 it is proposed to minimize the voltage delay problem by coating the lithium anode with a cyanoacrylate polymeric coating.

In accordance with U.S. Pat. No. 4,296,185 it is proposed to minimize the voltage delay problem by inserting a cyanoacrylate sheet in the cell contiguous to and in physical contact with the anode. It is further taught in U.S. Pat. No. 4,296,185 that this sheet should remain intact and contiguous to the anode during cell operation while allowing lithium ions to pass through it.

SUMMARY OF THE INVENTION

The invention is directed to an improvement in the reduction of voltage delay of a lithium oxyhalide cell wherein the lithium is exposed in the cell to the liquid electrolyte, e.g., $SOCl_2$, in which has been dissolved prior to cell assembly a substance from the group of alkyl cyanoacrylates and acrylic and substituted acrylic ester polymers. No specific anode treatments are necessary nor are any films contiguous to said anode required.

DETAILED DESCRIPTION OF THE INVENTION

In accordance with the invention, the voltage delay of a lithium or a lithium alloy liquid oxyhalide cell is minimized by dissolving in the oxyhalide electrolyte a cyanoacrylate ester or an acrylic ester polymer prior to adding the solution to the cell.

The passivation effect on lithium electrodes appears to result from film formation of lithium halide on the lithium surface. The conditions leading to control of the film are obscure, but it is postulated that weaker films have a lesser tendency to passivate. In order to show to what extent a film forms on a lithium electrode in contact with thionyl chloride, a typical electrolyte was made up with 1.6M $LiAlCl_4$ dissolved in $SOCl_2$. To a portion of this solution was added ethyl 2 cyanoacrylate in an amount of 61.5 mg per ml of electrolyte. It is presumed, although not known with certainty, that the ethyl 2 cyanoacrylate reacts in some way with the electrolyte to form an acrylic polymer not fully substituted with nitrile groups. Lithium coupons were stored in these solutions for five days, one set at room temperature and the other set at 71° C.

At room temperature, the electrolyte without polymer produced a dense passivating film of lithium chloride on the metallic lithium whereas electrolyte containing the polymer produced practically no passivating film. At 71° C., the polymer-free electrolyte produced a thick, massive passivating film whereas the polymer-containing electrolyte produced a very open and loose film of lithium chloride on the metallic lithium.

Alkyl 2-cyanoacrylates are unsaturated monomeric esters which polymerize readily at room temperature usually without deliberately added catalysts and which are used as adhesives. Polymerization is usually initiated by moisture present in the atmosphere. The compounds are described in the *Encyclopedia of Polymer Science and Technology*, John Wiley and Sons, 1964, Vol. 1, at pages 337 to 342. The acrylic ester polymers are described in the same volume on pages 246 to 328.

The anodic embodiments of the invention are best provided by including appropriate polymer in the electrolyte at the time of cell closure. If for some reason this preferred procedure is impractical, a body of acrylic polymer can be provided on the interior of a cell component or components remote from and not contiguous with the anode but in contact with the electrolyte and be permitted to dissolve in the electrolyte subsequent to cell closure. This latter alternative is not considered ideal because undesirable polymer concentration gradients may very well persist in the liquid electrolyte for considerable periods of time.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. The method for reducing the voltage delay in an electrochemical cell having a lithium or lithium alloy anode, a cathode current collector, and a liquid oxyhalide electrolyte which comprises:

(a) prior to cell assembly, dissolving in said oxyhalide electrolyte a substance from the group consisting of alkyl cyanoacrylates and acrylic and substituted acrylic polymers in order to form a liquid oxyhalide solution; and (b) during assembly of said cell, placing the said liquid oxyhalide solution in said cell as the electrolyte.

2. The method according to claim 1, wherein said oxyhalide electrolyte is LiAlCl$_4$ dissolved in thionyl chloride.

3. The method according to claim 1, wherein an alkyl cyanoacrylate is dissolved in said oxyhalide electrolyte.

4. The method according to claim 3, wherein said alkyl cyanoacrylate is ethyl 2 cyanoacrylate.

5. The method according to claim 4, wherein 61.5 mg of ethyl 2 cyanoacrylate is dissolved into each milliliter of said oxyhalide electrolyte.

6. The method for reducing voltage delay in an electrochemical cell having a lithium or lithium alloy anode, a cathode current collector and a liquid oxyhalide electrolyte which comprises placing a substance from the group of alkyl cyanoacrylates and acrylic and substituted acrylic ester polymers on an internal cell component remote from and not contiguous with said anode, said cell component being in contact with said electrolyte.

7. The method according to claim 6, wherein said oxyhalide is LiAlCl$_4$ dissolved in thionyl chloride.

8. The method according to claim 6, wherein an alkyl cyanoacrylate is placed on said internal cell component.

9. The method according to claim 8, wherein said alkyl cyanoacrylate is ethyl 2 cyanoacrylate.

* * * * *